2,782,175

SURFACE COATINGS OF SOLUTIONS OF FURFURAL-MODIFIED HYDROLYZED VINYL ACETATE-VINYL CHLORIDE COPOLYMERS

Paul F. Bruins, Brooklyn, N. Y., and Stephen S. Dorn, North Arlington, N. J., assignors to Carboline Co., St. Louis, Mo., a corporation of Missouri No Drawing. Application March 28, 1951, Serial No. 218,084

10 Claims. (Cl. 260—30.4)

Our invention relates to new and improved resins, new and improved resin coatings, and new and improved methods for making such resins and coatings. The invention covers the new products, irrespective of the method of manufacture.

The invention relates particularly to the production of resin coatings which are resistant to many acids and alkalis and to many solvents. These coatings are applied to metals, wood and other base materials.

Without limitation thereto, a preliminary explanation of one phase of the invention is stated below.

The resin starting material, which is known in the market as "Vinylite VAGH" is a resin copolymer of vinyl chloride, vinyl acetate, and vinyl alcohol. This starting material is made in the well-known manner by hydrolyzing a resin copolymer of vinyl chloride and vinyl acetate, in order to convert some of the acetate groups into hydroxyl groups. This commercial starting material may contain a trace of acidic material, which is a residue from the method of manufacture. This copolymer of vinyl chloride, vinyl acetate and vinyl alcohol is disclosed in U. S. Patent No. 2,512,726, issued June 27, 1950.

This commercial starting material is dissolved in furfural at ordinary room temperature of 20° C.–25° C. or at elevated temperature, and under standard pressure of 760 millimeters of mercury, to make an initial solution. Furfural is an unsaturated aldehyde which has two conjugated double bonds. We can use ordinary commercial furfural, which has a reddish brown color, a boiling point of 161.7° C. at standard pressure, and a flash point of 55° C.–57° C.

The formula of furfural is:

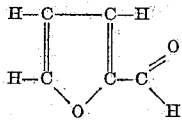

If this initial solution is kept at ordinary room temperature and at standard pressure, there is no substantial reaction in solution between the dissolved resin starting material and the furfural. If there is any reaction, it is much too slow for commercial purposes.

Such reaction in solution can be produced by means of heat, or by means of a suitable catalyst at ordinary room temperature or at elevated temperature.

In the reaction in solution, the furfural reacts with the hydroxyl groups of the dissolved resin starting material to form the corresponding acetal.

The modified starting material remains dissolved in the furfural to produce a final solution. This reaction is evidenced in the final solution by a thickening and increase in viscosity of the original solution.

If the reaction in solution is continued too long, the result is to produce a gel or to produce an unstable final solution which gels upon storage. The reaction is controlled in order to avoid these undesirable effects. If the reaction in solution is performed by heat, the temperature and the time of heating are controlled. If a catalyst is used in the reaction in solution, its effect is eliminated at the end of the selected period of reaction, as by neutralizing an acid catalyst or removing the catalyst by filtration or other means.

The resultant final solution remains stable and non-gelling under non-oxidizing condition, such as by excluding air and light, for a long period of time, if it is kept at a suitable temperature, as ordinary room temperature of 20° C.–25° C.

This final solution is applied by brushing or spraying or other means to produce a final dry resin coating. If the final solution is to be used for protecting a metal surface, it is desirable to provide the metal surface with an initial dry coating of a suitable primer which is adherent to the metal, and to which the final coating is adherent.

The final solution is applied at ordinary room temperature and under standard pressure to the bare metal or to the initial coating. Most of the furfural evaporates.

During the evaporation of the furfural, a final reaction takes place between the modified starting material and the furfural. In this example, the dissolved material is a copolymer of vinyl chloride and vinyl acetate in which some of the acetate groups have been converted to furfuraldehyde acetal. In this final reaction, the furfural is polymerized, it reacts with the modified resinous starting material, and there is cross-linking of the chains of the starting material, and also cross-linking between the modified starting material and the furfural. In order to secure this, it is desirable to form only thin initial coatings. As one example, the thickness of a coating is one-thousandth of an inch. If the excess furfural is allowed to evaporate from the coating at ordinary room temperature under standard pressure, it takes several hours to evaporate the excess furfural from the initial coating in order to form the final resin coating. Furfural is oxidized in the presence of air to form furoic acid. By forming a thin coating in the presence of air, there is an efficient catalytic action between the modified starting material and the furfural during the evaporation of the furfural. The oxygen of the air acts as a catalyst, either directly, or by acting indirectly in forming furoic acid. This is evidenced by the fact that the weight of the resin coating may be as much as 200% of the weight of the original starting material. After the initial thin resin coating has been formed, another thin resin coating may be formed by applying another coat of the final solution, until the finished resin coating has the desired finished thickness. The finished resin coating is allowed to dry for 24 hours at room temperature under standard pressure, before exposure to acid, alkali or solvent.

As an example of a priming material which we can use to provide a direct inner coating on a metal surface, we refer to a wash primer system such as a solution of polyvinyl butyral in an organic solvent, which contains lead chromate or zinc chromate pigments, to which phosphoric acid is added. This type is well-known. We can also use other well-known primers such as "Vinylite VMCH," which is described at page 464 of "Handbook of Material Trade Names" by Zimmerman and Lavine, published in 1946 by Industrial Research Service.

This primer mixture is applied to the metal surface at ordinary room temperature and at standard pressure, and the solvent is allowed to evaporate to produce a dry coating. This requires substantially 15–30 minutes. Chemically resistant pigments, such as titanium dioxide, may be added to the final solution to provide a resin paint coating.

The improved final resin coatings which are produced by the final solution are more resistant than rubber base coatings and the known vinyl resin coatings, to many solvents and to acids and alkalis. The improved resin coatings resist alcohols, and many straight chain chlorinated organic solvents such as ethylene dichloride and glacial acetic acid. They resist 52% nitric acid up to 125° F. Ordinary polyvinyl chloride paints resist only 30% nitric acid up to 150° F., and 45% sulfuric acid up to 200° F.

The improved resin coatings also resist aqueous sodium hydroxide solutions up to 50%, up to 190° F.

It is not necessary to use a plasticizer in the improved coatings, since the coating inherently has great flexibility. The elimination of need for plasticizer is advantageous in providing greater solvent and chemical resistance.

No primer is required when the improved coating is applied to wood, carbon or butadiene copolymers of the type known as "Hycar."

Our invention is further explained in the following examples, to which the invention is not limited.

*Example No. 1*

The commercial starting material is a copolymer of vinyl chloride, vinyl acetate and vinyl alcohol, which has been formed by hydrolyzing some of the vinyl acetate of a vinyl chloride-vinyl acetate copolymer. As previously noted, this commercial material may be slightly acidic.

All proportions stated in the entire description are by weight.

A preferred starting material consists of substantially 91% of vinyl chloride polymer, 3% of vinyl acetate polymer, the remainder being polyvinyl alcohol. The weight of the hydroxyl groups is substantially 2.3% of said starting material. This starting material is a hydrolyzed vinyl copolymer which contains ester groups.

The above proportions may be varied. The proportion of vinyl chloride polymer may be 90% or less. The proportion of vinyl acetate polymer may be increased to a maximum of substantially 10%. The proportion of polyvinyl alcohol, calculated as vinyl alcohol, may be increased to a maximum of 10%. The above proportions are illustrative and preferred, and the broader phase of the invention is not limited thereto.

15 parts of said commercial starting material are dissolved in 85 parts of commercial furfural, so that the dissolved starting material is 15% by weight of the initial solution. This may be done at said ordinary room temperature of 20° C.–25° C. at higher temperature to accelerate the formation of the solution, and at standard atmospheric pressure of 760 mm. of mercury. A true solution is thus formed, which has a brown color.

This solution is then heated at 80° C. under said standard pressure during a period of forty-eight hours, in order to modify the starting material by reacting the furfural with the hydroxyl groups of the starting material, and thus form the corresponding acetal. A large proportion of the furfural remains unreacted. The resultant product is a true solution of the modified starting material. It has a brown color and is more viscous than the original solution.

As one example, the final solution of the modified starting material has a viscosity of 300 centipoises at substantially 20° C. This viscosity is greater than the viscosity of the original solution of the unmodified commercial starting material. This final solution is stable during long periods at 16° C. to 38° C. Any trace of acid in the final solution may be neutralized by adding sodium hydroxide or other suitable base or alkali, to produce a pH of substantially 7, in order to increase the stability of the final solution.

If a resin coating is to be formed on a metal surface by means of said final solution, a primer coating is first formed in the metal surface, such as a butyral wash primer. The inner primer coating and the resin coating which is formed by means of the final solution may be formed at ordinary room temperature of 20° C.–25° C. and at standard pressure.

This inner or initial primer coating is allowed to dry, before the final solution which has resulted from said heating step is applied to form an outer resin coating or coatings.

As previously noted, the coating which is thus formed, may have up to 200% of the weight of the original commercial copolymer starting material, due to the final reaction with the furfural during the evaporation of the excess furfural.

*Example No. 2*

In order to secure a more highly concentrated solution of the commercial polymer starting material, a mixed solvent may be used. This mixed solvent may be a mixture of furfural with ethyl methyl ketone or toluene, or with both said additional solvents. Other solvents may form part of the mixed solvent, in addition to furfural.

Ethylmethylketone, $CH_3COC_2H_5$, has a boiling point of 79.6° C., and it also evaporates readily at ordinary room temperature.

Toluene, $CH_3C_6H_5$, has a boiling point of 110.7° C., and it also evaporates readily at ordinary room temperature.

The mixed solvent is evaporated in about one hour at room temperature under standard pressure, so that the respective resin coating is formed by the final solution in less time than in Example No. 1.

As an illustration, the mixed solvent consists of 25 parts of furfural, 25 parts of ethylmethylketone, and 25 parts of toluene, in which 25 parts of the commercial starting material are dissolved to make a 25% solution.

As another illustration, the mixed solvent consists of 25 parts of methyl isobutyl ketone, 25 parts of commercial xylene, and 25 parts of furfural, in which 25 parts of the commercial starting material are dissolved.

The low boiling ingredients of the mixed solvent may be initially mixed, then mixed with the furfural and the mixed solvent may be heated to 80° C. before dissolving the commercial starting material therein at standard pressure.

Either initial solution is also heated at 80° C. for 48 hours, and the procedure is the same as in Example No. 1.

*Example No. 3*

An acid catalyst, as illustrated by sulfuric acid, is added to the initial solutions of Example No. 1 or 2, in order to promote the formation of the acetal in solution, with little or no other reaction. The catalyst may be a 10% aqueous solution of sulfuric acid. The weight of the catalyst is 0.06% of the weight of the initial solution.

The addition of this catalyst makes it possible to omit the heating step of the previous examples, which is necessary in said previous examples to form the acetal. This initial solution may be allowed to stand two weeks at ordinary room temperature and under said standard pressure, in order to complete the acetal formation.

Said initial solution may be heated at 80° C. under said standard pressure in order to complete the formation of the acetal. Whenever we refer to a heating temperature of 80° C., this may be varied up to 100° C., but a heating temperature of 80° C. is highly preferred in order to control the reaction reliably.

*Example No. 4*

Prior to applying the final solution, which may be done by brushing or other method, said solution is mixed with a pigment which resists acids and alkalis, such as titanium dioxide or carbon black. This provides a resin paint coating.

*Example No. 5*

Instead of starting with a copolymer of vinyl chloride and vinyl acetate, and producing hydroxyl groups by hydrolyzing the vinyl acetate, the vinyl acetate monomer may be polymerized with monomers of other resins which are resistant to acids and alkalis.

Thus, a monomer of tri-fluoro-monochlor-ethylene, the polymer of which is known as "Kel-F," may be mixed with vinyl acetate monomer, and the mixed monomers are polymerized to produce a respective copolymer which is then hydrolyzed to produce hydroxyl groups from the vinyl acetate. The tri-fluoro-monochlor-ethylene is thus a substituent for the vinyl chloride and the proportions in this starting material may be as previously disclosed.

As another illustration, the substituent may be tetra-fluoro-ethylene, the polymer of which is known as "Teflon." These copolymers and others are designated, for the purposes of the claims, as vinyl polymer resins.

As another illustration, the substituent may be vinylidene chloride, the polymer of which is known as "Saran." This is described at pages 86–93 of the "The New Fibers" by Sherman and Sherman, published in 1946 by D. Van Nostrand Company, Inc.

In general, we provide hydroxyl groups in various starting copolymer resins which include vinyl acetate and we react said hydroxyl groups or some of them with furfural in order to produce the corresponding acetal.

The final reaction takes place wholly or substantially wholly in the presence of an oxidizing medium, such as the oxygen of the air, or in the presence of other polymerizing catalysts, such as peroxides, fluorides, chlorides and acids, while the excess furfural is evaporated.

If a pigment is added, such pigment is mixed with one of the ingredients of the mixed solvent, such as ethyl-methylketone, using a ball mill, and such mixture is added to the other ingredients of the solution, before or after dissolving the resin starting material.

Instead of using sulfuric acid as a catalyst for forming the acetal, we can use paratoluene sulphonic acid, or phosphoric acid, aluminum chloride and boron fluoride.

After the desired acetal-forming reaction in solution has been completed, the catalysts may be removed or their effect may be discontinued by means of neutralization, filtration, etc.

As tested by high frequency discharge, the finished resin coating is uniform and free from pores or holes.

Preferred embodiments of our invention have been described, but numerous changes and omissions and additions and substitutions may be made without departing from its scope.

In one aspect of our invention, we claim the cross-linked reaction product of an unsaturated polyvinyl acetal and furfural. This reaction product may be only one constituent of the improved end product.

In another aspect of our invention, we claim the cross-linked reaction product of an unsaturated polyvinyl acetal, which is a copolymer of vinyl acetate monomer with at least one other resin monomer, with furfural.

The furfural which is polymerized with the initial resin polymer or initial resin copolymer in the final coat-forming reaction, is designated as polyfurfural.

The first reaction between the small percentage of the hydroxyl groups of the starting material and the furfural, in which an acetal is formed, is a condensation reaction. Since furfural is an unsaturated compound, the formation of the acetal results in the addition of unsaturated double-bond groups to the linear chain of the polymer or copolymer which is used as the starting material. Such added unsaturated groups provide points for further addition type polymerization, in order to form cross-links in or between the linear polymer chain or chains of the starting material. Such cross-linking does not occur while the modified starting material is in solution, or such cross-linking is then negligible.

However, when the end solution is applied thus forming a film from which surplus solvent evaporates, including surplus furfural, such addition type cross-linking polymerization does occur. The result is to form a finished dry coating which has markedly decreased solubility and marked increased resistance to various chemicals.

Some of the furfural joins in the cross-linking reaction in the film, so that furfural groups are attached to the vinyl chain or chains of the starting material.

We claim:

1. A method which consists in forming an original solution of a copolymer in a solvent which includes furfural, said copolymer being a copolymer of vinyl chloride and vinyl acetate and vinyl alcohol, said copolymer having a maximum of substantially 10% of copolymerized vinyl alcohol and a maximum of substantially 10% of copolymerized vinyl acetate and a maximum of substantially 91% of copolymerized vinyl chloride, the weight of the furfural in said solvent being at least substantially equal to the weight of said dissolved copolymer resin, carrying out a reaction between said dissolved copolymer resin and only some of said furfural in said solution to produce a modified solution having dissolved therein a reaction product of said dissolved copolymer and said furfural containing acetal groups, said reaction product remaining dissolved in said modified solution, said modified solution containing unreacted furfural and being stable on storage in closed containers.

2. A method according to claim 1 in which said reaction is carried out at substantially 80° C.–100° C. during a period of substantially 48 hours under a pressure of substantially 760 millimeters of mercury.

3. A method according to claim 1 in which said reaction is carried out to produce a modified solution which has a viscosity of substantially 300 centipoises at 20° C., said viscosity of said modified solution being greater than the viscosity of the original solution.

4. A method according to claim 1 in which the acidity of said modified solution is adjusted to a pH of substantially 7, by dissolving a base in said modified solution.

5. A method according to claim 1, in which the original solvent consists substantially of substantially equal parts of furfural, ethylmethylketone and toluene.

6. A method according to claim 1, in which the original solvent consists substantially of substantially equal parts of methyl isobutyl ketone, xylene and furfural.

7. A method according to claim 1, in which the original solvent consists substantially of furfural.

8. A method according to claim 1, in which a catalyst is added to said original solution to accelerate said reaction.

9. A method according to claim 1, in which sulfuric acid is added as a catalyst to said original solution in the proportion of substantially 0.060% of the weight of said original solution.

10. A coated object, said object having a coating dried in the presence of air, said coating being the residue of an original wet thin film, said original wet film being a solution which includes a dissolved modified resin and uncombined furfural, said coating being a cross-linked polymer of said dissolved resin and of said uncombined furfural formed in said wet film in the presence of air, said modified resin being an original copolymer of vinyl chloride and vinyl acetate and vinyl alcohol in which the free hydroxyl groups of said vinyl alcohol have been changed to acetal groups, said original copolymer having a maximum of substantially 10% of copolymerized vinyl alcohol and a maximum of substantially 10% of copolymerized vinyl acetate and a maximum of substantially 91% of copolymerized vinyl chloride, the weight of the uncombined furfural in said original wet film being substantially equal to the weight of the modified resin in said original wet film.

References Cited in the file of this patent

UNITED STATES PATENTS

| | | |
|---|---|---|
| 2,085,995 | Patnode et al. | July 6, 1937 |
| 2,114,877 | Hall | Apr. 19, 1938 |
| 2,227,975 | Kenyon et al. | Jan. 7, 1941 |

(Other references on following page)

UNITED STATES PATENTS

| | | |
|---|---|---|
| 2,267,830 | Lewis | Dec. 30, 1941 |
| 2,323,333 | Kauth | July 6, 1943 |
| 2,363,297 | D'Alelio | Nov. 21, 1944 |
| 2,399,401 | Sonnichsen et al. | Apr. 30, 1946 |
| 2,441,470 | Carswell | May 11, 1948 |
| 2,487,223 | Cupery | Nov. 8, 1949 |
| 2,512,726 | Penn et al. | June 27, 1950 |
| 2,527,495 | Fitzhugh | Oct. 24, 1950 |

FOREIGN PATENTS

| | | |
|---|---|---|
| 351,082 | Great Britain | June 25, 1931 |